United States Patent [19]

Inoue

[11] Patent Number: 4,903,153
[45] Date of Patent: Feb. 20, 1990

[54] TAPE CARTRIDGE LOADING MECHANISM WITH CARTRIDGE HELD BY THE REEL DRIVE

[75] Inventor: Yoshihisa Inoue, Hannou, Japan

[73] Assignee: Nakamichi Corporation, Tokyo, Japan

[21] Appl. No.: 198,486

[22] Filed: May 25, 1988

[30] Foreign Application Priority Data

May 27, 1987 [JP] Japan .................................. 62-80123

[51] Int. Cl.⁴ ..................... G11B 15/66; G11B 15/675
[52] U.S. Cl. ....................................... 360/93; 360/95; 360/96.5; 360/96.6; 242/195; 242/197; 242/198
[58] Field of Search ....................... 360/95, 96.5, 96.6, 360/93, 132; 242/195, 197, 198

[56] References Cited

U.S. PATENT DOCUMENTS 4,477,851 10/1984 Dalzeil et al. ........................... 360/95
4,646,177 2/1987 Sanford et al. ........................ 360/95
4,704,645 11/1987 Murphy et al. ........................ 360/95

Primary Examiner—Robert S. Tupper
Attorney, Agent, or Firm—Pearne, Gordon, McCoy & Granger

[57] ABSTRACT

An apparatus for loading a tape cartridge for a magnetic instrument comprising a lever to move the tape cartridge from a loading/unloading position to an operative position by displacing relative to a chassis holder in which the tape cartridge is held and a reel drive partly contained in the tape cartridge to drive a reel therein, the reel drive including an engagement portion protrusively disposed in the holder to engage an engaged portion of the reel in the loading/unloading position whereby the tape cartridge is positioned in the holder by inserting the tape cartridge into the holder until the engaged portion of the reel engages the engagement portion of the reel drive.

4 Claims, 9 Drawing Sheets

TAPE CARTRIDGE LOADING MECHANISM WITH CARTRIDGE HELD BY THE REEL DRIVE

BACKGROUND OF THE INVENTION

A tape cartridge for a magnetic instrument is required to be loaded by inserting the tape cartridge into a holder. In such an apparatus for loading the tape cartridge, the tape cartridge is required to be secured in a predetermined positioned in the holder so that the tape cartridge is connected to a drive mechanism.

In a prior art, there has been used the apparatus for loading the tape cartridge comprising means to urge the tape cartridge so as to remove the tape cartridge from the holder in response to the tape cartridge being carried from the operative position to the loading/unloading position. In the prior apparatus, there has been required to provide the apparatus with means to position the tape cartridge in the holder to engage the tape cartridge against the force of the urging means when the tape cartridge is loaded in the holder.

However, there have been various tape cartridges having no engagement portion to position the tape cartridges in the holders. Thus, the tape cartridges are required to be provided with means to position the tape cartridges in the holders in response to the tape cartridges being inserted into the holders and also with means to lock the urging means, which disadvantageously causes the apparatus to be expensively provided.

SUMMARY OF THE INVENTION

Accordingly, it is a principal object of the invention to provide an apparatus for loading a tape cartridge for a magnetic instrument in which the tape cartridge can be positioned in a holder without any means to position the tape cartridge in the holder so that the apparatus can be inexpensively provided.

In accordance with the present invention, there is provided an apparatus for loading a tape cartridge for a magnetic instrument comprising;

means to move said tape cartridge between an operative position and a loading/unloading position by relatively displacing a holder in which said tape cartridge is held and reel drive means to drive a reel contained in said tape cartridge;

and said reel drive means including an engagement portion protrusively disposed in said holder to engage an engaged portion of said reel in said loading/unloading position whereby said tape cartridge is positioned in said holder by inserting said tape cartridge into said holder while said engaged portion of said reel engages said engagement portion of said reel drive means.

BRIEF DESCRIPTION OF THE DRAWINGS

The above and other objects and features of the invention will be apparent from the description of the embodiment of the invention taken along with the accompanying drawings in which;

FIG. 9 is a perspective view of reel drive means;

DESCRIPTION OF THE PREFERRED EMBODIMENT

Figure 1:
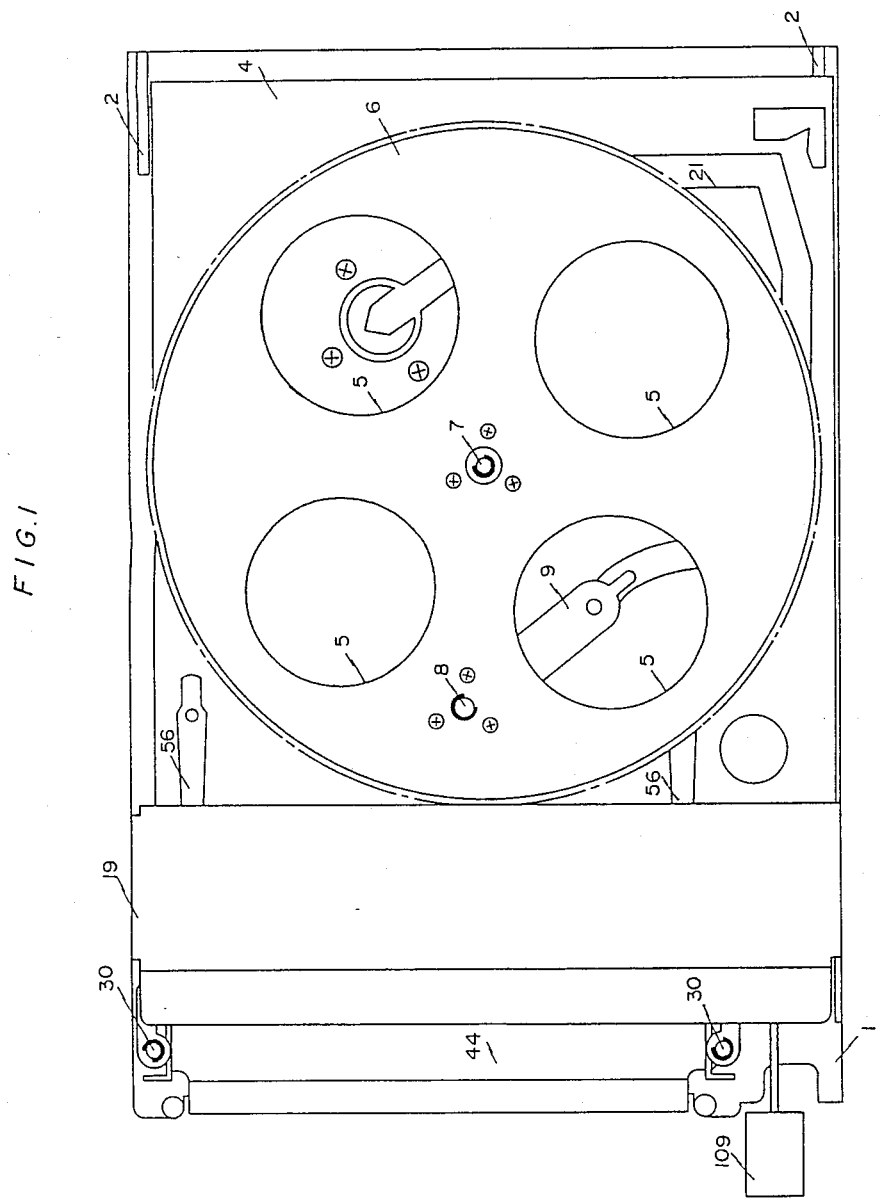
FIG. 1 is a plan view of an apparatus for loading a tape cartridge for a magnetic instrument in the condition of the tape cartridge being able to be loaded or unloaded.
Figure 2:
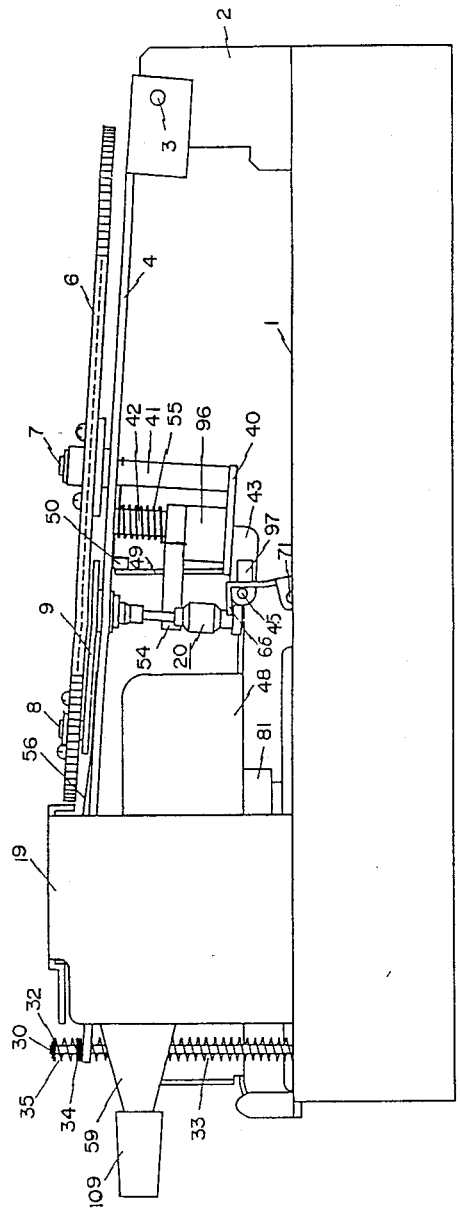
FIG. 2 is a side elevational view of the apparatus of FIG. 1.

Referring now to FIGS. 1 through 5, there is shown an apparatus for loading a tape cartridge 10 for a magnetic instrument such as a magnetic storage, for example. Brackets 2 of a chassis 1 have a holder base plate 4 at one end thereof pivotally supported by pivotal pins 3 and 3 thereon. On the holder base plate 4 a shaft 7 journals a spur wheel 6 having a gear provided on the peripheral face thereof and four openings 5, 5, 5 and 5 provided therein. The spur wheel 6 is adapted to be driven by a gear drive mechanism (not shown) including an electric motor and worm gears in both directions. An arm 9 supported by a shaft 8 on a lower face of the spur wheel 6 is provided with drawing pin means 20 to draw a leader block 11 out of the respective tape cartridge 10. The drawing pin means 20 is adapted to be guided along a guide groove 21 in an upper face of the holder base plate 4 to guide the leader block 11 to a winding reel (not shown).

Figure 6:
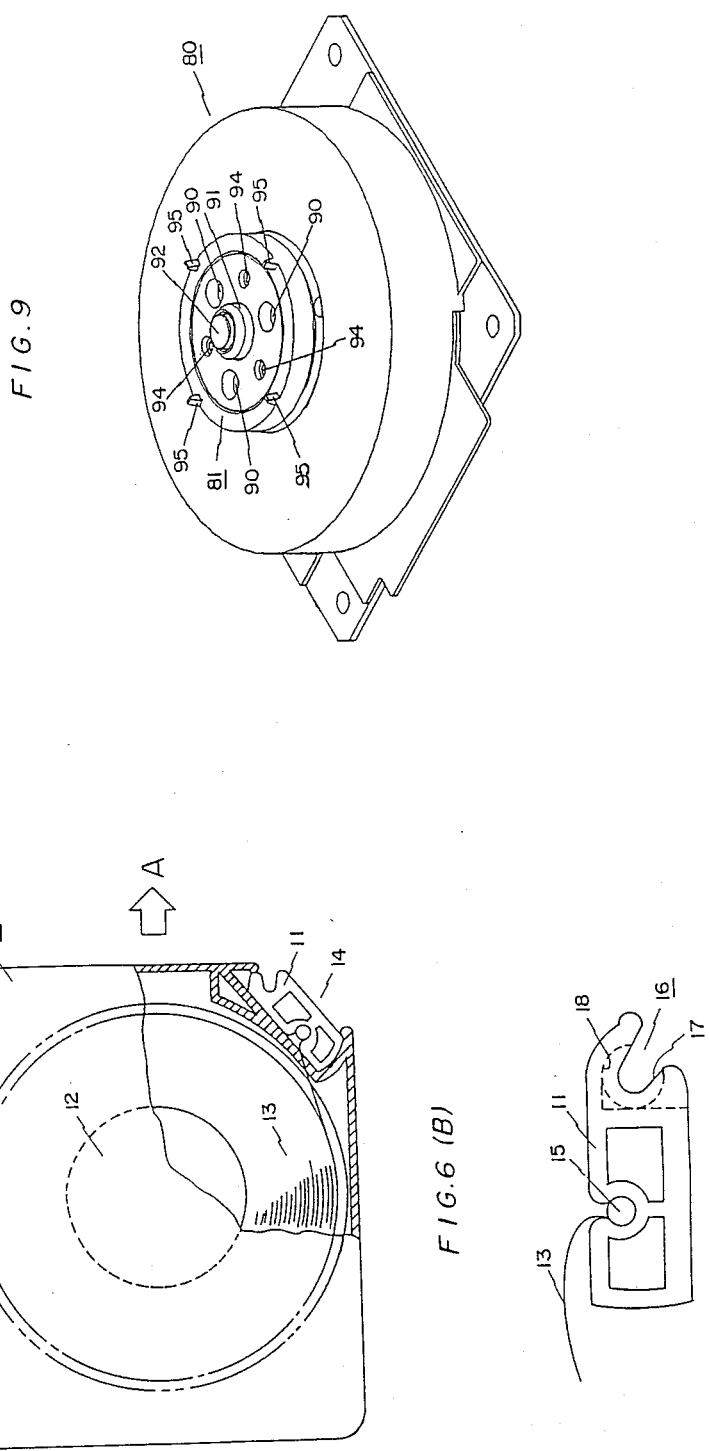
FIG. 6a is a plan view of a tape cartridge with a portion broken away.
FIG. 6b is an enlarged plan view of a leader block in the tape cartridge.

The tape cartridge 10 may be in the form of one which is commonly called "IBM 3480" as described in Japanese Patent Application Laying-Open No. 171,773/1983, for example. The tape cartridge 10 has a single reel 12 contained therein and the leader block 11 is provided at the leader end of a tape 13 wound on the single reel 12 as shown in FIGS. 6a and 6b. The leader block 11 is removably engaged in an opening 14 in the tape cartridge 10. The tape 13 is connected to the leader block 11 by engaging the leader end of the tape 13 with the leader block 11 at its side recess by a cylindrical pin 15. A slot 16 formed in the end of the leader block 11 includes a slot portion 17 which is narrower than the width of the tape 13 and a slot portion 18 which is wider than the width of the tape 13, as shown in FIG. 6b. An arrow A indicated in FIG. 6a indicates a direction in which the tape cartridge 10 is inserted into a cartridge container 44.

Figure 7:
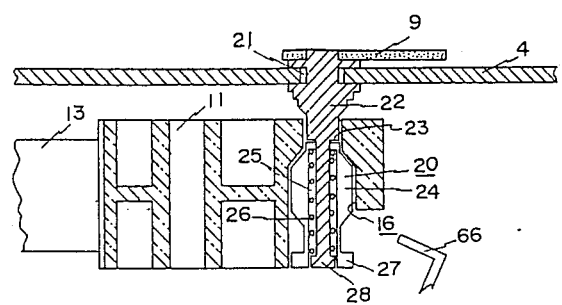
FIGS. 7a and 7b illustrate in cross sectional view the leader block and a drawing pin member having different relative positions thereof.
Figure 7:
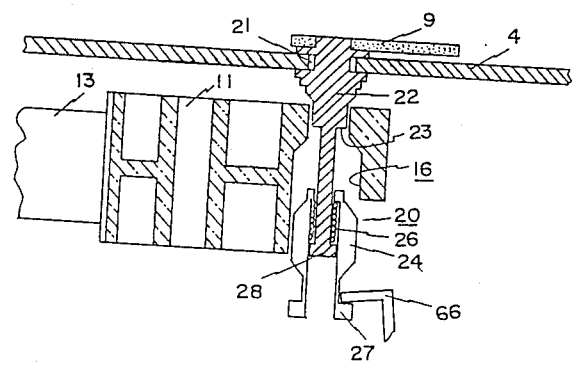

The drawing pin means 20 together with the relation of the leader block 11 is illustrated in FIGS. 7a and 7b in detail.

A pin 22 is downwardly provided on the arm 9 and extends through the guide groove 21 in the holder base plate 4 and has a shoulder 23 formed thereon by thinning the pin 22 and a stop 28 provided at the lower end thereof.

An engagement member 24 is slidably mounted on the pin 22 and upwardly urged by a coil spring 26 disposed around the thinned pin 22 within the hollow portion 25 of the engagement member 24. The engagement member 24 has the peripheral configuration complementary that of the inner configuration of the slot 16 in the leader block 11 and a flange 27 provided at the lower end thereof. As shown in FIGS. 7a and 7b, the height of the leader block 11 is so set that it is larger than the width of the tape 13.

As shown in FIGS. 1 through 5, a pair of pins 30 and 30 are provided on the chassis 1 to control the pivotal movement of the holder base plate 4. The pair of pins 30 and 30 extend through holes 31 and 31 in the holder base plate 4 at its free end and have stops 32 and 32 of an E ring secured thereto. A first pair of coil springs 33 and 33 disposed around the pins 30 and 30 between the chassis 1 and the holder base plate 4 urge the holder base plate 4 far away from the chassis 1. A pair of rubber rings 34 and 34 having an inner diameter smaller than an outer diameter of the pins 30 and 30 are disposed around the pins 30 and 30 and over the holes 31 and 31, respectively. A top cover 19 of C shape may be mounted on the chassis 1 so as to surround an upper face of the free end of the holder base plate 4.

Figure 3:
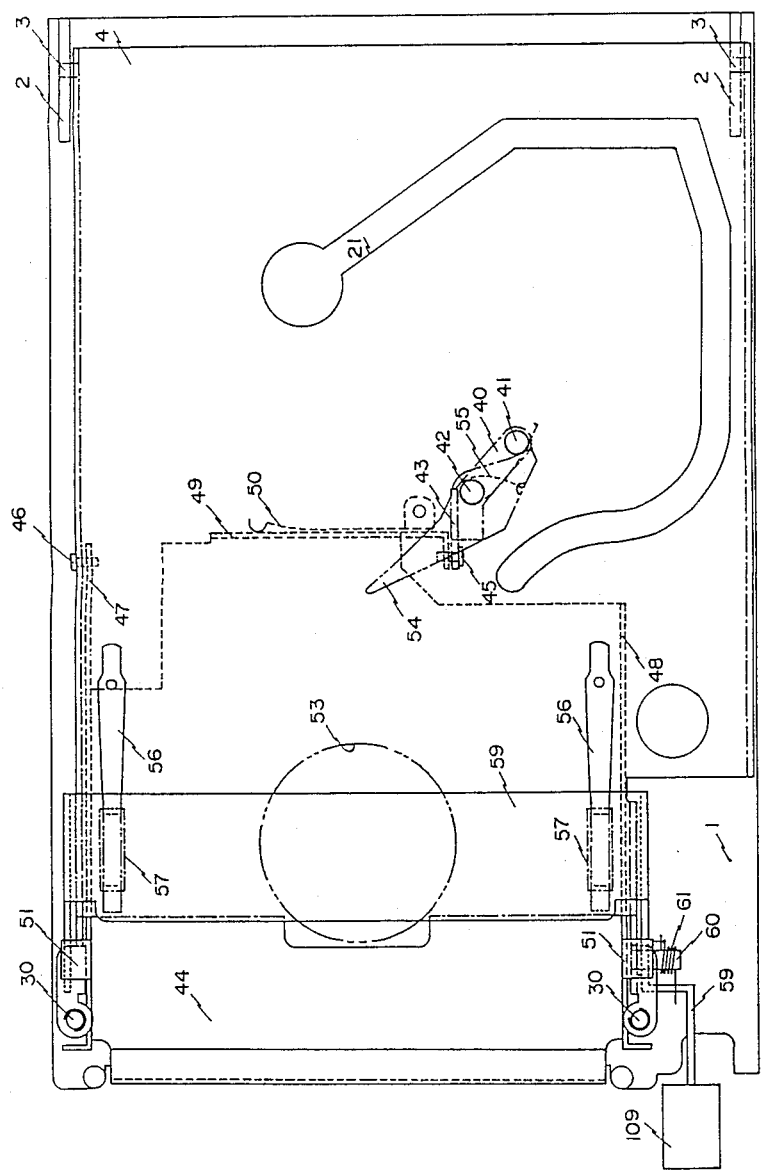
FIG. 3 is a plan view of the apparatus of FIGS. 1 and 2 for illustrating the gist of the apparatus.
Figure 4:
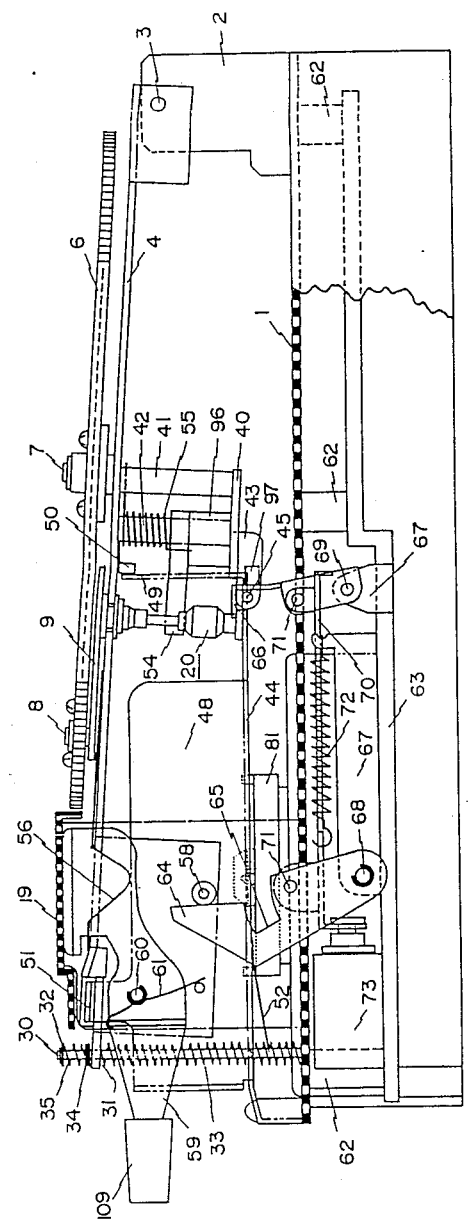
FIG. 4 is a side elevational view of the apparatus of FIGS. 1 and 2 for illustrating the gist of the apparatus with a portion thereof broken away.

As shown in FIGS. 3 and 4, a connecting plate 40 is provided by pins 41 and 42 on the holder base plate 4 at a lower face of a center portion thereof and has a vertical bracket 43 formed on an end of the connecting plate 40 in a direction parallel to the sheet face of FIG. 4. The cartridge container 44 at its rear end is pivotally supported by a pivotal pin 45 on the vertical bracket 43 while a leftward side wall 47 of the cartridge container 44 is pivotally supported on the holder base plate 4 by a pivotal pin 46 which is in turn disposed in alignment with the pivotal pin 45. A rear wall 49 of the cartridge container 44 is urged by a leaf spring 50 provided on the lower face of the holder base plate 4 about the axes of the pivotal pins 45 and 46 in a counterclockwise direction as viewed in FIG. 4. Holder stops 51 and 51 provided on the upper ends of the leftward and rightward side walls 47 and 48 of the cartridge container 44 and disposed over the holder base plate 4 push the holder base plate 4 on its upper face by the action of gravity on the cartridge container 44 and an urging force of the leaf spring 50 in a counterclockwise direction as viewed in FIG. 4. A pair of leaf springs 52 and 52 are provided on the lower face of the front end of the cartridge container 44. The cartridge container 44 is provided with an opening 53 through which a reel support 81 extends so as to drive the reel 12 in the tape cartridge 10 which is inserted between the cartridge container 44 and the holder base plate 4.

A cartridge removal lever 54 which serves to remove the tape cartridge 10 from the cartridge container 44 is pivotally mounted by the pin 42 on the connecting plate 40 and is urged by a torsion spring 55 in a counterclockwise direction as viewed in FIG. 3.

As shown in FIG. 3, a pair of leaf springs 56 and 56 are secured to the holder base plate 4 on an upper face thereof to push the tape cartridge 10 on its upper face toward the operative position of the tape cartridge 10 to hold it in its operative position and downwardly extend through openings 57 and 57 in the holder base plate 4 so as to protrude therefrom. A pair of locking pins 58 and 58 are provided on the side walls 47 and 48 of the holder base plate 4 to control the pivotal movement of the holder base plate 4 and a substantially C-shaped rotary plate 59 is disposed so as to surround the upper face and the side walls 47 and 48 of the holder base plate 4 and pivotally supported by pivotal pins 60 and 60 on the side walls 47 and 48 of the holder base plate 4. A loading lever 109 is integrally formed with the rotary plate 59 and urged by a toggle spring 61 in a counterclockwise direction as viewed in FIGS. 4 and 5. The loading lever 109 serves to downwardly urge the pivotal pins 60 and 60 because the upper face of the rotary plate 59 engages the top cover 19. This urging force of the loading lever 109 together with the urging force of the leaf spring 50 urges the holder base plate 4 about the axes of the pivotal pins 3 and 3 in a counterclockwise direction as viewed in FIGS. 4 and 5, but since the urging force of the loading lever 109 is set weaker than those of the springs 33 and 33, the holder base plate 4 is set at the loading/unloading position as shown in FIGS. 1 through 4.

In the illustrated condition, the holder base plate 4 is inclined relative to the chassis 1, but the cartridge container 44 is positioned in a manner parallel to the chassis 1 because it is pivotally supported on the holder base plate 4.

As shown in FIG. 4, a subsidiary chassis 63 is provided by connecting members 62, 62 and 62 under the chassis 1. A pair of locking arms 64 and 64 having notches 65 and 65, respectively serve to lock the holder base plate 4 when the tape cartridge 10 is brought to the operative position thereof and a control arm 66 serves to engage with the flange 27 of the engagement member 30 for the drawing pin means 20. The arms 64, 64 and 66 are pivotally mounted on brackets 67, 67, 67 and 67 of the subsidiary chassis 63.

Figure 8:
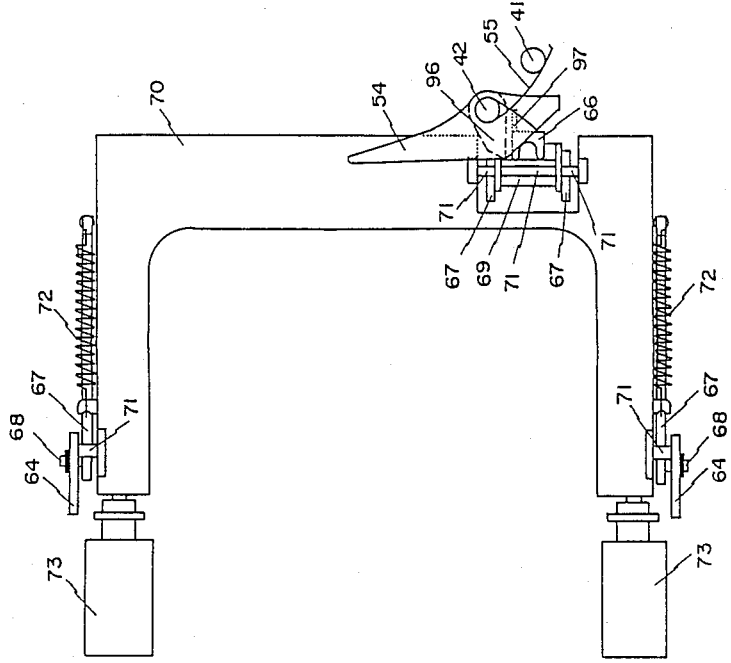
FIGS. 8a and 8b illustrate in plan view locking arms and a control arm being connected to each other and a cartridge removal arm being operated.
Figure 8:
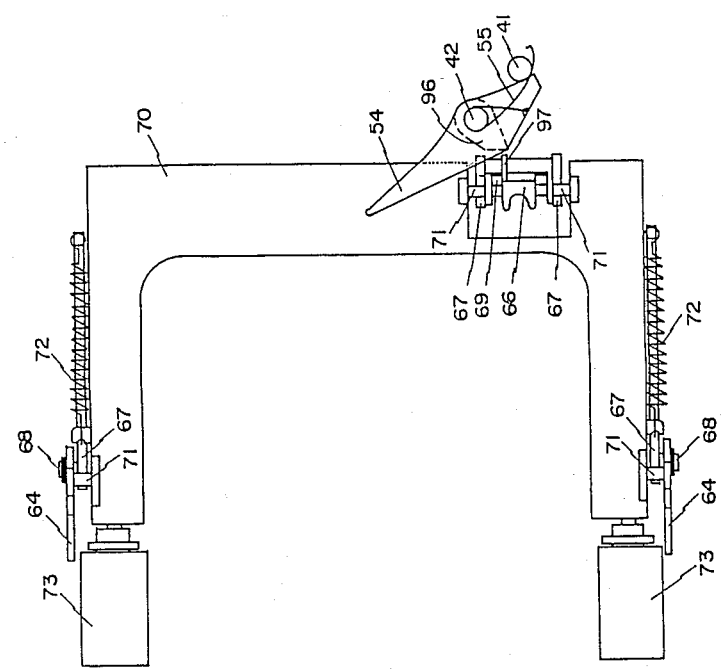

A center portion of the pair of locking arms 64 and 64 and the control arm 66 are associated with a slidable plate 70 in the form of C shape as shown in FIGS. 8a and 8b, so as to be moved together with the slidable plate 70. Three connecting pins 71, 71 and 71 are provided to connect the slidable plate 70 to the respective arms.

Figure 5:
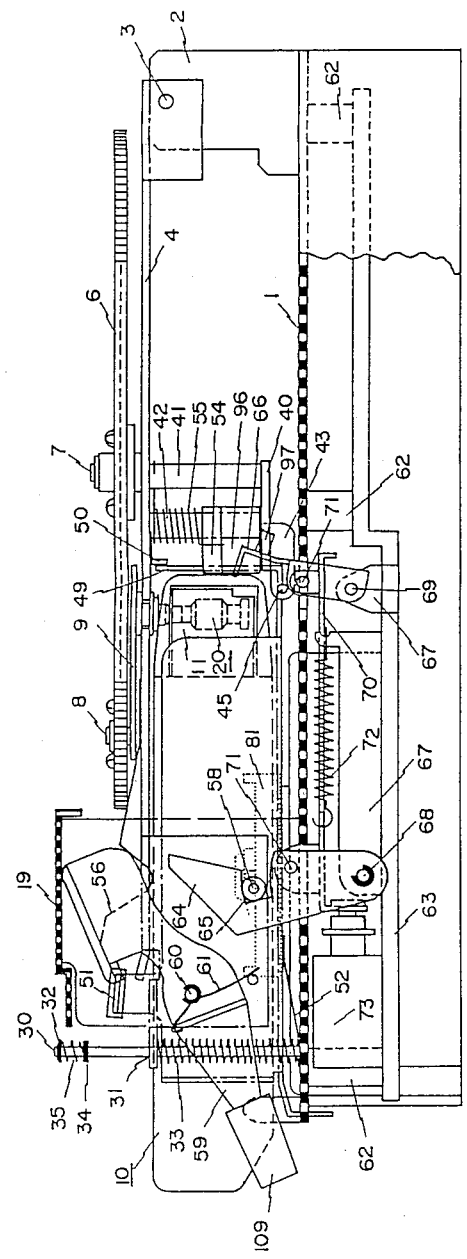
FIG. 5 is a side elevational view of the apparatus with the tape cartridge being carried to an operative position.

A pair of coil springs 72 and 72 are provided between the slidable plate 70 and the brackets 67 and 67 to urge the slidable plate 70 in a rightward direction of FIGS. 4 and 5 while a pair of solenoids 73 and 73 serve to move the slidable plate 70 in a leftward direction against the coil springs 72 and 72 when electrically excited.

In the condition of the apparatus being positioned at the cartridge loading/unloading position and the cartridge container 44 having no tape cartridge 10 loaded therein, a lever stop 96 disposed below the cartridge removal lever 54 integrally therewith is positioned over a protrusion 97 on the control arm 66 as shown in FIG. 8a. Thus, if the loading lever 109 is pushed down in the counterclockwise direction as viewed in FIG. 4 without any tape cartridge loaded in the cartridge container 44, the lever stop 96 moves down to be positioned at the right hand of the protrusion 97 on the control arm 66 to prevent the control arm 66 from being moved. Therefore, even though the locking pins 58 and 58 are positioned at the notches 65 and 65 of the locking arms 64 and 64, the control arm 66 is prevented from being pivotally moved. This prevents the locking arms 64 and 64 from being pivotally moved in the clockwise direction by the springs 72 and 72. Thus, the holder base plate 4 can be never locked to the operative position.

Figure 10:
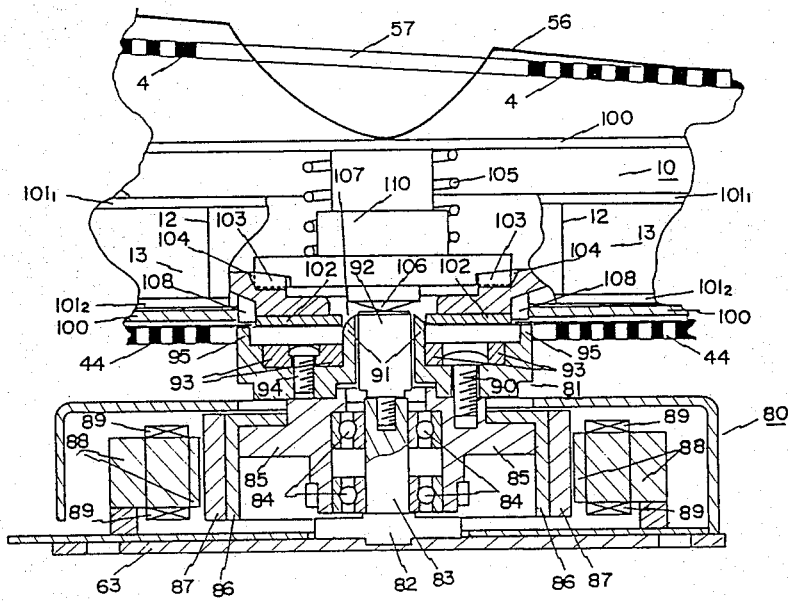
FIGS. 10a and 10b illustrate the reel drive means and the tape cartridge being engaged with each other, respectively.
Figure 10:
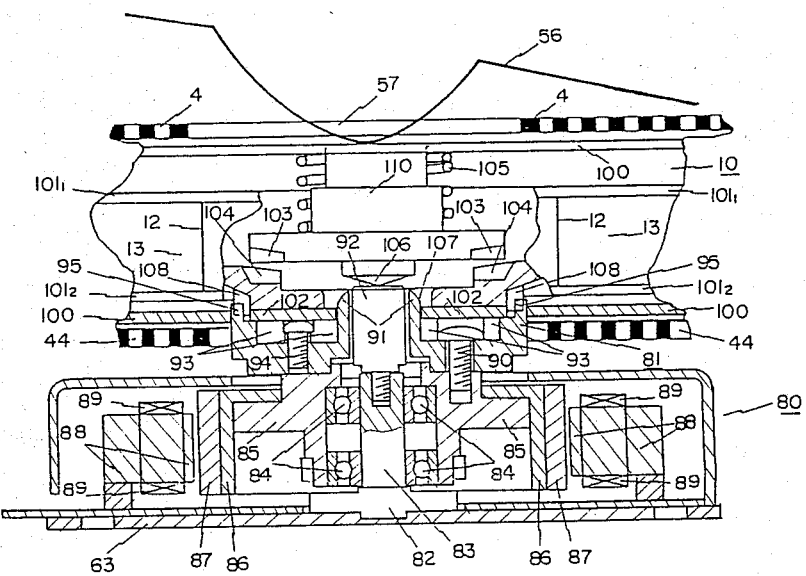

As shown in FIGS. 10a and 10b, a motor base 82 securely mounted on the subsidiary chassis 63 has a shaft 83 upwardly provided thereon and a rotor 85 is rotatively mounted on the shaft 83 by bearings 84 and 84. The rotor 85 has a motor driving magnet 87 provided on the periphery thereof with a connecting member 86 disposed between the rotor 85 and the magnet 87. A yoke 88 of magnetic material is disposed on the motor base 82 and has a coil 89 wound thereon. The reel support 81 is securely mounted on the upper face of the rotor 85 by screws 90, 90 and 90. A hollow cylindrical portion 91 is formed on the reel support 81 at the center thereof and is provided with a leading end having a curved outer periphery thereof. A stationary shaft 92 extends through the hollow cylindrical portion 91 so as to protrude from the leading end of the cylindrical portion 91 and securely screwed into the shaft 83. An annular magnet 93 is secured to the reel support 81 by three screws 94, 94 and 94 and four protrusions 95, 95, 95 and 95 are provided on the periphery of the magnet 93 with the space of 90 degree disposed therebetween.

As shown in FIG. 10a, the leading end of the cylindrical portion 91 and the shaft 92 protrude from the opening 53 in the cartridge container 44 at the cartridge loading/unloading position.

Also as shown in FIG. 10a, the tape cartridge 10 has the tape 13 wound on the reel 12 between upper and lower flanges $101_1$ and $101_2$ thereof within a housing 100. An annular plate 102 of magnetic material having a central opening 107 provided therein is securely disposed on the lower face of the reel 12. A gear 108 is disposed on the peripheral face of the annular plate 102 and is adapted to engage with the four protrusions 95, 95, 95 and 95 on the reel support 81. A reel stop 110 having a gear 103 formed on the lower peripheral face thereof and a conical protrusion 106 formed on the central lower face thereof is urged by a coil spring 105 downwardly as viewed in FIG. 10a.

By this urging force of the coil spring 105 is maintained an engagement of the gear 103 with a gear 104 on the reel 12, which causes the rotation of the reel 12 to be controlled and the lower flange $101_2$ of the reel 12 to be forced against the housing 100 by the coil spring 105.

Although the reel stop 110 can move vertically relative to the housing 100, it is so constructed that it never rotates together with the rotation of the reel 12. Furthermore, the conical protrusion 106 is so constructed that it never protrudes from the central opening 107 in the annular plate 102, and also the annular plate 102 is so constructed that it never protrudes from a bottom opening in the housing 100 so that the reel 12 can engage the reel support 81.

In operation, as shown in FIGS. 1 through 4, at the cartridge loading/unloading position where the holder base plate 4 has an upward pivotal movement provided thereto by the coil springs 33 and 33 so as to be inclined relative to the chassis 1 while the cartridge container 44 is positioned parallel to the chassis 1, the slidable plate 70 is so controlled by the locking arms 64 and 64 and the locking pins 58 and 58 that the slidable plate 70 never moves in a rightward direction while the control arm 66 is in the condition of being rotated in the counterclockwise direction as viewed in FIG. 4. Thus, as shown in FIG. 7b, the control arm 66 is engaged with the flange 27 of the engagement member 24 for the drawing pin means 20 so that the engagement member 24 is forced in a downward direction against the coil spring 26.

In this condition, as the tape cartridge 10 is inserted into the cartridge container 44 in a direction indicated by an arrow A as shown in FIG. 6a, the housing 100 of the tape cartridge 10 moves within the cartridge container 44 while its bottom slides on the shaft 92 of the reel drive means 80 urged down-wardly by the leaf springs 56 and 56 on the holder base plate 4 as shown in FIG. 10a and also the cartridge removal lever 54 is rotated against the toggle spring 55 in the clockwise direction as viewed in FIG. 3.

As the tape cartridge 10 continues to be further inserted into the cartridge container 44, the shaft 92 and the cylindrical portion 91 at their upper end extend through the opening 107 in the annular plate 102 as shown in FIG. 10a. In this condition, the tape cartridge 10 is held at its position against the urging force of the cartridge removal lever 54 from the torsion spring 55 by the extension of the shaft 92 and the cylindrical portion 91 through the opening 107 in the annular plate 102. As shown in FIG. 7b, since the engagement member 24 for the drawing pin means 20 is downwardly forced by the control arm 66, the drawing pin means 20 is positioned in the slot 16 in the leader block 11.

As the loading lever 109 is pushed downwardly as shown in FIG. 4 in order that the tape cartridge 10 is brought to the operative position, the pivotal plate 59 is rotated in the counterclockwise direction about the engagement point as viewed in FIG. 5 because the upper face of the pivotal plate 59 is engaged with the top cover 19 with the result that the pivotal pins 60 and 60 move downwardly. Thus, the holder base plate 4 is rotated about the pivotal pins 3 and 3 against the urging force of the coil springs 33 and 33 in the counterclockwise direction as viewed in FIG. 5 while the connecting plate 40 on the holder base plate 4 through the pins 41 and 42 and also the cartridge container 44 pivotally mounted on the holder base plate 4 by the pivotal pins 45 and 46 are rotated by the leaf spring 50 and the holder stops 51 and 51 about the pivotal pins 3 and 3 together with the pivotal movement of the holder base plate 4. At that time, the coil springs 35 and 35 on the pins 30 and 30 are held at their position by the rubber rings 34 and 34.

Although the tape cartridge 10 moves downwardly together with the movement of the cartridge container 44 by the leaf springs 56 and 56 on the holder base plate 4, as the tape cartridge 10 is pushed down from the condition in which the tape cartridge 10 is inserted into the cartridge container 44 as shown in FIG. 10a, the housing 100 and the reel 12 are pushed down in the condition in which the reel stop 104 is held at its position by the shaft 92, with the result that the gear 104 on the reel 12 is disengaged from the gear 103 on the reel stop 103 so that the control of the rotation of the reel 12 is relieved.

As the tape cartridge 10 further moves downwardly, the protrusions 95, 95, 95 and 95 on the reel support 12 engage the gear 108 on the reel 12 and the annular plate 102 under the reel 12 is absorbed by the magnet 93 on the reel support 81. As the tape cartridge 10 continues to further move downwardly, only the housing 100 moves downwardly without any displacement of the reel 12. Thus, the forced engagement of the lower flange $101_2$ with the housing 100 is relieved so that the reel 12 can rotate within the tape cartridge 10.

At that time, the locking pins 58 and 58 are faced with the notches 65 and 65 in the locking arms 64 and 64 and the slidable plate 70 moves in a rightward direction by the springs 72 and 72, which causes the locking arms 64 and 64 and the control arm 66 to be rotated in the clockwise direction as viewed in FIG. 5 until the tape cartridge 10 reaches the operative position as shown in FIG. 5. In this position, since the cartridge removal lever 54 is rotated by the tape cartridge 10 in the clockwise direction as viewed in FIG. 8b, the lever stop 96 is also angularly displaced from the rightward position of the control arm 66 as shown in FIG. 8b and as a result the control arm 66 is never disturbed from being rotated.

In this condition, the holder base plate 4 is locked by the locking arms 64 and 64 while the drawing pin means 20 engages the leader block 11 as shown in FIG. 7a because of the disengagement of the flange 27 of the engagement member 24 for the drawing pin means 20 from the control arm 66.

While the tape cartridge 10 moves from the loading-/unloading position to the operative position, the holder base plate 4 moves from its inclination condition of FIG. 4 relative to the chassis 1 to the parallel condition of FIG. 5 relative thereto, but the cartridge container 44 angularly moves about the pivotal pins 3 and 3 in the counterclockwise direction from the parallel condition of FIG. 4 to the inclined condition relative to the chassis 1. As the holder base plate 4 further rotates, the leaf springs 52 and 52 at the front portion of the cartridge container 44 engage the chassis 1 and at that time the cartridge container 44 changes from the counterclockwise rotation to the clockwise rotation. Thus, the cartridge container 44 reaches the position where it becomes parallel to the chassis 1 and the holder base plate 4 as shown in FIG. 5.

In this condition, the spur wheel 6 rotates in the counterclockwise direction as viewed in FIG. 1 and as a result the drawing pin means 20 moves along the guide groove 21 in the holder base plate 4 until the leader block 11 engages the winding reel (not shown) in the magnetic instrument. Thus, it will be noted that the tape 13 can be transferred by driving the winding reel and the reel drive means 80. It should be noted that although the reel support 81 rotates during the tape transfer, the central shaft 92 never rotates, which prevents the conical protrusion 106 on the reel stop 110 from sliding on the shaft 92 because the reel stop 110 never rotates.

Removal or unloading operation of the tape cartridge 10 will be described hereinjustbelow. As there is generated a predetermined instruction to unload the tape cartridge 10 from the condition of FIG. 5, the solenoids 73 and 73 are electrically excited. This electrical excitation of the solenoids 73 and 73 causes the slidable plate 70 to move in a leftward direction against the springs 72 and 72 and therefore the locking arms 64 and 64 and the control arm 66 to rotate in a counterclockwise direction as viewed in FIG. 5. This causes the control arm 66 to engage the flange 27 of the engagement member 24 for the drawing pin means 20 and also the locking arms 64 and 64 to be disengaged from the locking pins 58 and 58.

As a result, in the condition that the engagement member 24 for the drawing pin means 20 is held at its position by the control arm 66, the holder base plate 4 abruptly rotates about the pivotal pins 3 and 3 by the coil springs 33 and 33 until the holder base plate 4 is controlled by the coil springs 35 and 35 and the stops 32 and 32 which are both on the pins 30 and 30 over the rubber rings 34 and 34. Thus, the tape cartridge 10 reaches the loading/unloading position as shown in FIG. 4.

It should be noted that the loading/unloading position of the tape cartridge 10 is held by the engagement of the locking arms 64 and 64 with the locking pins 58 and 58 although the solenoids 73 and 73 are interrupted from being electrically excited.

The abrupt rotation of the holder base plate 4 causes the condition of absorption of the annular plate 102 by the magnet 93 as shown in FIG. 10b to be forcibly relieved so that the tape cartridge 10 is brought to the condition of engagement with the reel drive means 80 as shown in FIG. 10a, but the tape cartridge 10 is upwardly displaced from the position of FIG. 4 by the inertia of the tape cartridge 10 against the urging force of the leaf springs 56 and 56 forced against the cartridge container 44 on its upper face. At that time, the shaft 92 of the reel drive means 80 and the cylindrical portion 91 of the reel support 81 are disengaged from the opening 107 in the annular plate 102, which causes the cartridge removal lever 54 to rotate in the counterclockwise direction as viewed in FIG. 8a by the urging force of the torsion spring 55. Thus, the tape cartridge 10 is removed or unloaded from the cartridge container 44.

Although one embodiment of the invention has been illustrated and described with reference to the accompanying drawings, it will be apparent to those skilled in the art that it is by way of example, and that various changes and modifications may be made without departing from the spirit and scope of the invention. For example, the invention may be applied to an apparatus in which there is provided no means to urge the tape cartridge 10 so as to be removed from the holder. It should be understood that the invention is to be defined only by the appended claims.

What is claimed is:

1. An apparatus for loading a tape cartridge for a magnetic instrument comprising:
    a chassis;
    means to move said tape cartridge between an operative position and a loading/unloading position by displacing relative to said chassis a holder in which said tape cartridge is held;
    reel drive means to rotatively drive a reel contained in said tape cartridge;
    and said reel drive means including an engagement portion protrusively disposed in said holder to engage an engaged portion of said reel in said loading/unloading position whereby said tape cartridge is positioned in said holder by inserting said tape cartridge into said holder while said engaged portion of said reel engages said engagement portion of said reel drive means.

2. An apparatus for loading a tape cartridge for a magnetic instrument as set forth in claim 1, and wherein said engagement portion of said reel drive means comprises a stationary shaft disposed at the center of said reel drive means while said engaged portion of said reel comprises a plate provided in said reel and having an opening so constructed to receive said stationary shaft.

3. An apparatus for loading a tape cartridge for a magnetic instrument as set forth in claim 2, and further comprising a reel stop provided within said tape cartridge and engaging said stationary shaft to release the reel for rotation by said reel drive means.

4. An apparatus for loading a tape cartridge for a magnetic instrument as set forth in claim 3, and wherein said reel stop is also stationary in a rotational direction.

* * * * *